(12) United States Patent
    Debus et al.

(10) Patent No.: US 12,570,065 B2
(45) Date of Patent: Mar. 10, 2026

(54) PRESS MACHINE WITH MODULAR LINEAR ACTUATOR SYSTEM

(71) Applicant: PDInnovative LLC, Fenton, MO (US)

(72) Inventors: Jeffrey E. Debus, Ballwin, MO (US); Darrell B. Harrelson, St Peters, MO (US)

(73) Assignee: PDInnovative LLC, Fenton, MO (US)

( * ) Notice: Subject to any disclaimer, the term of this patent is extended or adjusted under 35 U.S.C. 154(b) by 348 days.

(21) Appl. No.: 18/462,789

(22) Filed: Sep. 7, 2023

(65) Prior Publication Data

US 2023/0415440 A1    Dec. 28, 2023

Related U.S. Application Data

(63) Continuation of application No. 17/664,644, filed on May 23, 2022, now Pat. No. 11,752,720.

(Continued)

(51) Int. Cl.
    *B30B 1/18*         (2006.01)
    *B30B 15/12*        (2006.01)
    *F16H 25/20*        (2006.01)

(52) U.S. Cl.
    CPC ................ *B30B 1/18* (2013.01); *B30B 1/183* (2013.01); *B30B 15/12* (2013.01); *F16H 25/205* (2013.01);
    (Continued)

(58) Field of Classification Search
    CPC ........... B30B 1/18; B30B 1/181; B30B 1/183; B30B 1/186; B30B 15/26; B30B 15/28;
    (Continued)

(56) References Cited

U.S. PATENT DOCUMENTS

| | | | |
|---|---|---|---|
| 5,488,880 A | 2/1996 | Sartorio | |
| 6,193,625 B1 | 2/2001 | Ullrich | |

(Continued)

FOREIGN PATENT DOCUMENTS

| | | | |
|---|---|---|---|
| CN | 109732968 A | 5/2019 | |
| EP | 0929396 B1 | 7/2000 | |

(Continued)

OTHER PUBLICATIONS

Translation of JP-5406502.*

(Continued)

*Primary Examiner* — Bobby Yeonjin Kim
(74) *Attorney, Agent, or Firm* — Nixon Peabody LLP

(57) ABSTRACT

A linear-actuated press machine comprises a press ram with a tool, a first linear actuator having a first actuator rod, a second line actuator having a second linear actuator rod, a high-speed motor coupled to the first linear actuator for providing a high-speed condition on the press ram, a first high-torque motor coupled to the first linear actuator, and a second high-torque motor coupled to the second linear actuator. The press machine (i) advances the tool toward the part by operation of the high-speed motor associated with the first linear actuator, (ii) forms the part with the tool by simultaneous operation of the first high-torque motor associated with the first linear actuator and the second high-torque motor associated with the second linear actuator, and (iii) retracts the tool from the part by operation of the high-speed motor associated with the first linear actuator.

17 Claims, 8 Drawing Sheets

Related U.S. Application Data

(60) Provisional application No. 63/263,603, filed on Nov. 5, 2021, provisional application No. 63/260,978, filed on Sep. 8, 2021.

(52) U.S. Cl.
CPC ................ *F16H 2025/2081* (2013.01); *F16H 2025/2087* (2013.01)

(58) Field of Classification Search
CPC ... B30B 15/288; B30B 15/0094; B30B 15/12; F16H 25/22; F16H 25/24; F16H 25/2204; F16H 2025/2081; F16H 2025/2087
See application file for complete search history.

(56) References Cited

U.S. PATENT DOCUMENTS

| | | | |
|---|---|---|---|
| 6,640,601 B2 | 11/2003 | Hatty | |
| 7,284,407 B2 | 10/2007 | Imaeda | |
| 7,357,073 B2 | 4/2008 | Aoshima | |
| 7,413,029 B2 | 8/2008 | Seno | |
| 7,574,891 B2 | 8/2009 | Futamura | |
| 7,752,880 B2 | 7/2010 | Sakamoto | |
| 7,880,345 B2 | 2/2011 | Hoffmann | |
| 7,997,190 B2 | 8/2011 | Patton | |
| 8,220,384 B2 | 7/2012 | Bosga | |
| 8,715,132 B2 | 5/2014 | Kopecek | |
| 8,727,931 B2 | 5/2014 | Hafner | |
| 8,739,595 B2 | 6/2014 | Hafner | |
| 8,823,229 B2 * | 9/2014 | Brieschke | F16H 19/025 310/90 |
| 10,024,405 B2 | 7/2018 | Emmons | |
| 10,228,046 B2 | 3/2019 | Parmar | |
| 10,279,556 B2 * | 5/2019 | Imaeda | B30B 15/068 |
| 10,696,000 B2 | 6/2020 | Kosse | |
| 10,828,858 B2 | 11/2020 | Gontkosky | |
| 10,919,248 B2 | 2/2021 | Hattori | |
| 10,927,933 B2 | 2/2021 | Emmons | |
| 10,962,090 B2 | 3/2021 | Hafner | |
| 2004/0170718 A1 | 9/2004 | Futamura | |
| 2005/0204798 A1 | 9/2005 | Imaeda | |
| 2006/0249038 A1 | 11/2006 | Futamura | |
| 2009/0071351 A1 | 3/2009 | Patton | |
| 2009/0247346 A1 | 10/2009 | Hvolka | |
| 2009/0260463 A1 | 10/2009 | Fukano | |
| 2010/0050796 A1 | 3/2010 | Eschborn | |
| 2010/0206187 A1 | 8/2010 | Hafner | |
| 2013/0012349 A1 | 1/2013 | Hafner | |
| 2013/0074710 A1 | 3/2013 | Kuboe | |
| 2014/0202345 A1 | 7/2014 | Wood | |
| 2016/0243778 A1 | 8/2016 | Imaeda | |
| 2016/0273620 A1 | 9/2016 | Hafner | |
| 2019/0255791 A1 | 8/2019 | Hattori | |
| 2020/0147915 A1 | 5/2020 | Mayer | |
| 2020/0215778 A1 | 7/2020 | Chiu | |
| 2021/0231198 A1 | 7/2021 | Emmons | |

FOREIGN PATENT DOCUMENTS

| | | | | |
|---|---|---|---|---|
| EP | 1894708 A1 | 3/2008 | | |
| EP | 2375102 A1 | 10/2011 | | |
| EP | 2432671 A2 | 3/2012 | | |
| EP | 1570979 B1 | 2/2013 | | |
| EP | 3065945 B1 | 7/2019 | | |
| EP | 2158074 B1 | 4/2020 | | |
| EP | 3286456 B1 | 6/2020 | | |
| EP | 3552956 B1 | 10/2020 | | |
| EP | 3752731 A1 | 12/2020 | | |
| EP | 3093529 B1 | 8/2021 | | |
| JP | S60247494 A | * | 12/1985 | |
| JP | S 60247496 A | | 12/1985 | |
| JP | H 04243723 A | | 8/1992 | |
| JP | H 04117718 U | | 10/1992 | |
| JP | H11221700 A | * | 8/1999 | B30B 1/18 |
| JP | 2008188631 A | | 8/2008 | |
| JP | 4174150 B2 | | 10/2008 | |
| JP | 4551144 B2 | | 9/2010 | |
| JP | 5406502 B2 | * | 2/2014 | B30B 15/12 |
| JP | 5555679 B2 | | 7/2014 | |
| JP | 5707206 B2 | | 4/2015 | |
| JP | 2020151729 A | | 9/2020 | |
| WO | WO 1992/012362 A1 | | 7/1992 | |

OTHER PUBLICATIONS

Translation of JP-H11221700.*
Translation of JP-S60247494.*
Extended European Search Report and Opinion in European Patent Application No. 22867942.9, dated Jun. 24, 2025 (17 pages).
Extended European Search Report and Opinion in European Patent Application No. 22873478.6, dated Sep. 5, 2025 (9 pages).
Examination Report No. 1 in Australian Patent Application No. 2022341195, dated Apr. 30, 2024 (3 pages).
Conditional Notice of Allowance in Canadian Patent Application No. 3,231,669, dated Apr. 4, 2024 (3 pages).
United States Patent and Trademark Office; International Search Report and Written Opinion of International Searching Authority for International Patent Application No. PCT/US2022/042591, mailed Feb. 15, 2023 (16 pages).

* cited by examiner

PRESS MACHINE WITH MODULAR LINEAR ACTUATOR SYSTEM

RELATED APPLICATIONS

This application is a continuation of U.S. patent application Ser. No. 17/664,644, filed May 23, 2022, now allowed, which claims priority to U.S. Provisional Application Ser. No. 63/260,978, filed Sep. 8, 2021, and U.S. Provisional Application Ser. No. 63/263,603, filed Nov. 5, 2021, each of which is herein incorporated by reference in its entirety.

COPYRIGHT

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever

FIELD OF THE INVENTION

The present invention relates to press machines for forming parts. More particularly, this invention relates to press machine that includes multiple linear actuators for driving the press ram in which at least one of the linear actuators provides different functions.

BACKGROUND OF THE INVENTION

In a typical linear-actuated press, there are a pair of tools (e.g., a die used to bend a part) that are used to form a part. One tool in the pair of tools is typically stationary. The other tool moves in a linear fashion toward the stationary tool. The to-be-formed part is located between the pair of tools and is formed by the pressing force created by the moving tool. The linear motion of the moving tool is typically created by a motor that rotates a male-and-female screw mechanism that directly or indirectly couples the moving tool to the output shaft of the motor.

The moving tool in a linear-actuated press engages in linear movement in two directions. In the downward stroke, the moving tool is moved downwardly with no resistive force to the point in which it engages the to-be-formed part. The tool then continues the downward movement as it engages the part to form it. In the upward stroke, the tool moves away from the now-formed part. The productivity of these machines (e.g., parts formed per unit time) is dependent on the speed at which the tool can be moved downwardly to engage the to-be-formed part and upwardly to move away from the formed part. This type of operation can be effectuated in smaller presses with fair productivity (e.g., 50 ton-presses or less) in that the same motor can deliver enough vertical speed to the moving tool and also enough torque to create the force, necessary on the moving tool for forming the part.

However, in large presses (e.g., greater than 50-ton presses, such as a 100-ton press or more), the problem is that a motor cannot be commercially selected that delivers both the high-speed condition and the high-torque condition necessary for the linear-actuated press. If the motor is chosen that is capable of delivering the high torque (i.e., to produce high force on the moving tool), its rotational speed and, hence, the vertical speed of the moving tool is limited. Thus, the machine's productivity is compromised because it takes too much time to advance the moving tool to the part and retract the tool from the formed part.

Consequently, large presses commonly utilize hydraulic actuators that can deliver the high forces for forming the part and do so with acceptable speed so as to have adequate productivity. However, there are several problems associated with hydraulic actuators, such as the temperature dependency of the working fluid and the messiness of hydraulic fluid that flows through various pumps, valves, and filters, often resulting in leaks of the fluid within the manufacturing facility. Furthermore, many large presses are driven by crank shafts that are critical components requiring significant bearings with tight tolerances and lubrications systems for preventive maintenance. Crankshafts for these high-force presses also require the use of a counterbalance system for creation of bearing journal clearances for lubrication, which that can be problematic. Further, large presses using a crankshaft often require to two or more connecting rods that attach to the ram slide and are subject to timing issues if they become twisted or bent. These crankshafts are subject to deformation when the mechanical press is under certain conditions, such as when they are overloaded or become stuck at bottom dead center.

The present disclosure provides for a linear-actuated press machine that delivers high forces (such as attainable in a hydraulic press) with the controllability and high speeds that increase productivity and without the problems associated with hydraulic presses. The linear-actuated press system also avoids the problems associated with high-force presses that use crankshafts for driving the press ram.

All these and other objects of the present invention will be understood through the detailed description of the invention below.

SUMMARY OF THE INVENTION

In one aspect, the present invention is directed to a press machine for forming a part, comprising a planetary gear system, a first motor, a second motor, and a tool. The planetary gear system includes a ring gear, a sun gear, and a plurality of planet gears in connection between the sun gear and the ring gear. The planetary gear system has an output shaft that is coupled to a linear actuator. The first motor is coupled to the planetary gear system for producing a high-speed condition on the linear actuator. A second motor is coupled to the planetary gear system for producing a high-force condition on the linear actuator. The tool is coupled to the linear actuator for engaging and forming the part.

In another aspect, a press machine for forming a part comprises a linear actuator, a press ram, planetary gear system, a first motor, and a second motor. The linear actuator has a male-female screw arrangement and an actuator rod that is threadably coupled to the male-female screw arrangement. The press ram is coupled to the actuator rod of the linear actuator. The press ram is for receiving a tool for forming a part. The planetary gear system includes a ring gear, a sun gear, and a plurality of planet gears located between the sun gear and the ring gear. The planetary gear system has an output shaft that provides rotational movement to the male-female screw arrangement of the linear actuator. The first motor is coupled to the planetary gear system for producing a high-speed condition on the linear actuator for advancing the press ram toward the part. The second motor is coupled to the planetary gear system for producing a high-force condition on the linear actuator for forming the part with the tool on the press ram.

In another aspect, the present disclosure is a method of operating a linear-actuated press machine. The linear-actuated press machine comprising a first motor, a second motor, a linear actuator, a planetary gear system, and a tool coupled to the linear actuator for forming a part, the planetary gear system being driven by the first motor and the second motor, the planetary gear system driving the linear actuator. The method comprises (i) advancing the tool toward the part by operation of the first motor in a low-force and high-speed condition, (ii) forming the part with the tool by operation of the second motor in a high-force and low-speed condition, and (iii) after the part has been formed by the tool, retracting the tool from the part by use of at least one of the first motor and the second motor.

In a further aspect, the present disclosure is a press machine for forming a part. The press machine comprises a linear actuator, a press ram, a planetary gear system, a first motor, and a second motor. The linear actuator has a male-female screw arrangement and an actuator rod that is coupled to the male-female screw arrangement. The actuator rod undergoes linear movement in response to rotational movement of the male-female screw arrangement. The press ram is coupled to the actuator rod of the linear actuator. The press ram is for receiving a tool for forming the part. The press ram undergoes movement toward or away from the part in response to the corresponding linear movement of the actuator rod. The planetary gear system includes a ring gear, a sun gear, and a plurality of planet gears between the sun gear and the ring gear. The plurality of planet gears is attached to a planet carrier. The planet carrier rotates an output shaft for the planetary gear system. The output shaft is coupled to the male-female screw arrangement of the linear actuator. The first motor is coupled to the planetary gear system for producing a low-force and high-speed condition on the press ram. The second motor is coupled to the planetary gear system for producing a high-force and low-speed condition on the press ram.

In yet another aspect, the present invention is a press machine for forming a part comprising an actuator capable of linear movement to drive a tool that forms the part, a planetary gear system, a first motor, and a second motor. The planetary gear system includes a ring gear, a sun gear, and a plurality of planet gears in connection with the sun gear and the ring gear. The planetary gear system has an output shaft that is coupled to the plurality of planet gears. The output shaft is coupled to the actuator. The actuator includes a male-female threaded mechanism for producing the linear movement of the actuator. The first motor drives the sun gear to produce a high-speed condition on the actuator. The second motor drives the ring gear to produce a high-force condition on the actuator.

In another aspect, the present invention is a press machine for forming a part comprising an actuator capable of linear movement to drive a tool that forms the part, a planetary gear system, a first motor, and a second motor. The planetary gear system includes a ring gear, a sun gear, and a plurality of planet gears between the sun gear and the ring gear. The planetary gear system has an output shaft that is coupled to the plurality of planet gears. The output shaft is coupled to the actuator. The actuator includes a male-female thread mechanism for producing the linear movement of the actuator. The first motor drives the sun gear to produce a high-speed/low-force linear movement condition on the actuator. The second motor drives the ring gear to produce a low-speed/high-force linear movement condition on the actuator.

In another aspect, the invention is a method of operating a linear-actuated press machine for forming a part. The press machine comprises a first motor, a second motor, a linear actuator, a planetary gear system, and a tool coupled to the linear actuator. The planetary gear system is coupled to the first motor, the second motor, and the linear actuator. The method comprises (i) advancing the tool toward the part by operation of the first motor in a low-force and high-linear-speed condition, (ii) forming the part with the tool by operation of the second motor in a high-force and low-linear-speed condition, and (iii) after the part has been formed by the tool, retracting the tool from the part by use of at least one of the first motor and the second motor.

In yet a further embodiment, a press system for forming a part comprises a first linear actuator, a second linear actuator, a press ram, a high-speed motor, a first high-torque motor, and a second high-torque motor. The first linear actuator has a first male-female screw arrangement and a first actuator rod that is coupled to the first male-female screw arrangement. The first actuator rod undergoes linear movement in response to rotational movement of the first male-female screw arrangement. The second linear actuator has a second male-female screw arrangement and a second actuator rod that is coupled to the second male-female screw arrangement. The second actuator rod undergoes linear movement in response to rotational movement of the second male-female screw arrangement. The press ram is coupled to the first actuator rod and the second actuator rod. The press ram is for receiving a tool for forming the part. The press ram undergoes movement toward or away from the part in response to the corresponding linear movement of the first and second actuator rods. The high-speed motor is coupled to the first male-female screw arrangement of the first linear actuator for providing a high-speed and low-force condition on the press ram. The high-speed motor is for advancing the press ram toward the part and retracting the press ram from the part. The first high-torque motor is coupled to the first male-female screw arrangement of the first linear actuator. The second high-torque motor is coupled to the second male-female screw arrangement of the second linear actuator. The first and second high-torque motors provide a low-speed and high-force condition on the press ram for forming the part.

In another aspect, a press system for forming a part comprises a press ram, a first linear actuator arrangement, a second linear actuator arrangement, and a plurality of second linear actuator arrangements. The press ram is for receiving a tool forming the part. The first linear actuator arrangement has a first male-female screw arrangement and a first actuator rod that is coupled to the first male-female screw arrangement. The first actuator rod undergoes linear movement in response to rotational movement of the first male-female screw arrangement. The first actuator rod is coupled to the press ram. The first linear actuator arrangement includes a first motor coupled to the first male-female screw arrangement for producing a high-speed and low-force condition on the press ram to advance or retract the press ram from the part. The first linear actuator arrangement includes a second motor coupled to the first male-female screw arrangement for producing a high-force and low-speed condition on the press ram for forming the part. Each of the plurality of second linear actuator arrangements has a second male-female screw arrangement and a second actuator rod that is coupled to the second male-female screw arrangement. Each of the second actuator rods is coupled to the press ram. Each of the plurality of second linear actuator arrangements includes a high-force motor for producing a high-force condition on the press ram. The high-force motors operating simultaneously with the second motor of the first linear actuator arrangement for forming the part.

In another aspect, the present disclosure relates to a method of operating a linear-actuated press machine. The linear-actuated press machine comprises a press ram with a tool, a first linear actuator having a first actuator rod that is coupled to the press ram, a second line actuator having a second linear actuator rod that is coupled to the press ram, a high-speed motor coupled to the first linear actuator for providing a high-speed condition on the press ram, a first high-torque motor coupled to the first linear actuator, and a second high-torque motor coupled to the second linear actuator. The first and second high-torque motors provide a low-speed and high-force condition on the press ram for forming the part. The method includes (i) advancing the tool toward the part by operation of the high-speed motor associated with the first linear actuator, (ii) forming the part with the tool by simultaneous operation of the first high-torque motor associated with the first linear actuator and the second high-torque motor associated with the second linear actuator, and (iii) after the part has been formed by the tool, retracting the tool from the part by operation of the high-speed motor associated with the first linear actuator.

In a further aspect, the invention is a method of operating a linear-actuated press machine for forming a part. The press machine comprises a first motor, a second motor, a linear actuator, a planetary gear system with an output shaft, and a linear actuator coupled to the output shaft. The method comprises (i) by use of the first motor, producing a high-rotational-speed condition at the output shaft of the planetary gear system, (ii) converting, by use of the linear actuator, the high-rotational-speed condition at the output shaft to high-speed linear movement to advance a tool toward the part, (iii) by use of the second motor, producing a high-torque condition at the output shaft of the planetary gear system, and (iv) converting, by use of the linear actuator, the high-torque condition at the output shaft to linear movement with a high force that forms the part.

In another aspect, the invention is a press machine for forming a part comprises a planetary gear system, a first motor, and a second motor. The planetary gear system includes a ring gear, a sun gear, and a plurality of planet gears between the sun gear and the ring gear. The planetary gear system has an output shaft for driving a linear actuator that is coupled to a tool. The first motor is coupled to the planetary gear system for producing a high-rotational-speed and low-torque condition on the output shaft. The second motor is coupled to the planetary gear system for producing a low-rotational-speed and high-torque condition on the output shaft.

In another aspect, the invention is a press system for forming a part, comprising a press ram having tool, a first actuator arrangement, and a second actuator arrangement. The tool is for engaging and forming the part. The first actuator arrangement comprises a first motor and a first linear actuator. The first linear actuator is coupled to the press ram. The first actuator arrangement provides a high-speed and low-force condition for the press ram. The second actuator arrangement includes a second motor, a second linear actuator coupled to the press ram, and a planetary gear system. The second actuator arrangement provides a low-speed and high-force condition for the tool. The planetary gear system acts to reduce the rotational speed of an output shaft of the second motor when the first actuator arrangement is operating in the high-speed and low-force condition.

In a further aspect, a press system for forming a part comprises a press ram with a tool, a first actuator arrangement, and one or more second actuator arrangements. The tool is for engaging and forming the part. The first actuator arrangement comprises a first motor, a second motor, a first linear actuator, and a planetary gear system. The planetary gear system includes a ring gear, a sun gear, and a plurality of planet gears between the sun gear and the ring gear. The planetary gear system having an output shaft that is coupled to the first linear actuator. The first linear actuator is coupled to the press ram. The first motor is coupled to the planetary gear system for producing a high-speed and low-force condition on the press ram. The second motor is coupled to the planetary gear system for producing a high-force and low-speed condition on the press ram. Each of the one or more second actuator arrangements comprises a high-force motor and an associated high-force actuator that is coupled to the press ram. Each second actuator arrangement is for delivering additional force to the press ram when the first actuator arrangement is providing the high-force and low-linear-speed condition. In one embodiment, each of the second actuator arrangements also includes a clutch for reducing the speed of an output shaft of the associated high-force motor when the first actuator arrangement is operating in the high-linear-speed and low-force condition. In another embodiment, each of the second actuator arrangements also includes a second planetary gear system for reducing the speed of an output shaft of the associated high-force motor when the first actuator arrangement is operating in the high-linear-speed and low-force condition.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which.

Figure 1:
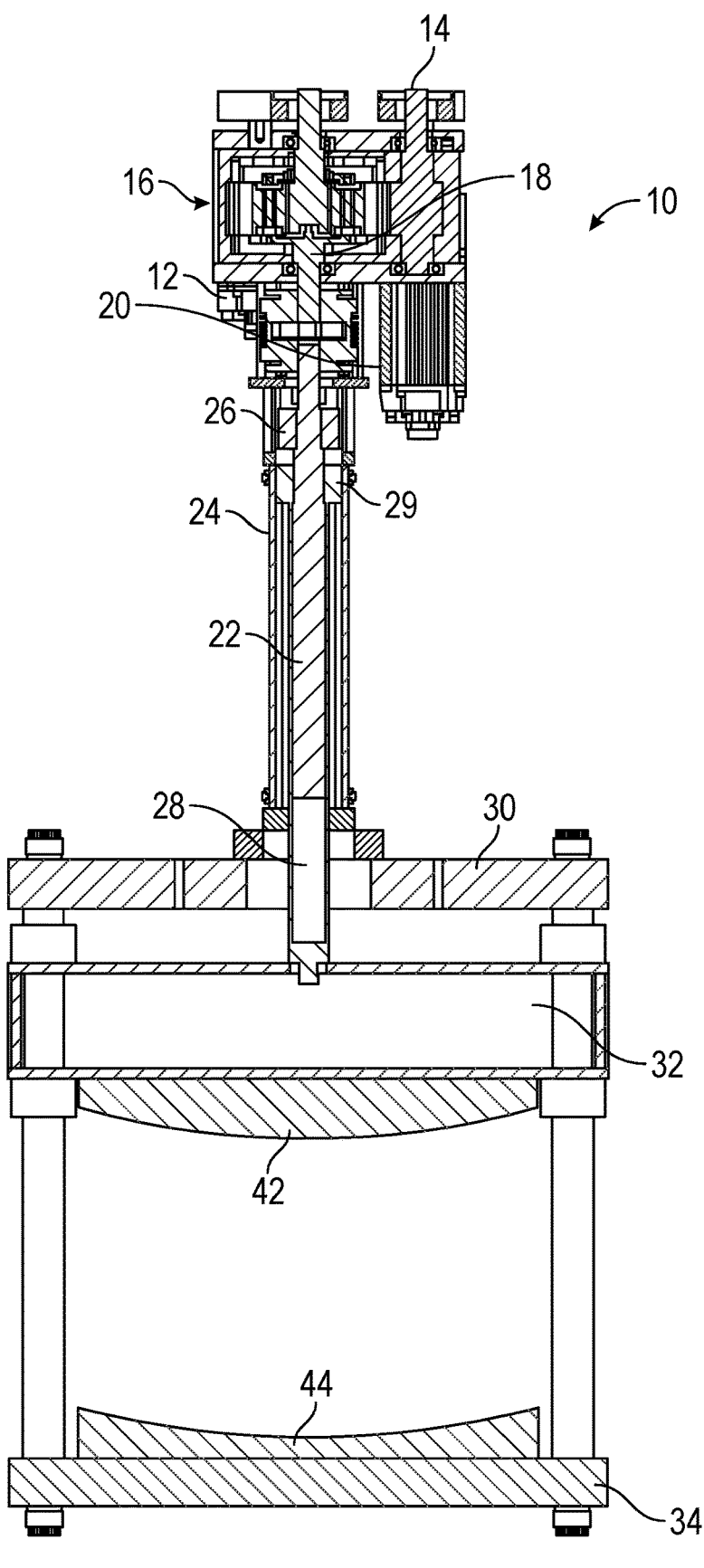
FIG. 1 illustrates a side view of one embodiment of a linear-actuated press using a planetary gear system.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

As shown in FIG. 1, a linear-actuated press 10 includes a first motor 12 and a second motor 14 that are used to drive a planetary gear system 16. The planetary gear system 16 has an output shaft 18 that is attached to a coupling device 20, which, in turn, is connected to the actuator screw 22 of a linear actuator 24. The actuator screw 22 is permitted to rotate, without moving vertically, and is supported by at least one thrust bearing 26. The linear actuator 24 further includes an actuator rod 28 having an upper threaded portion 29 that is threadably connected to the actuator screw 22. The upper threaded portion 29 is externally shaped to non-rotationally lock within the actuator 24, such that rotation of the actuator screw 22 causes vertical movement of actuator rod 28. Consequently, when the first motor 12 or the second motor 14 is operational, the output shaft 18 of the planetary gear system 16 is rotated at a known speed and a known torque, which causes the actuator rod 28 to linearly move at a known linear velocity and with a known force.

To create the necessary movement for forming a part in the press 10, the linear actuator 24 is fixedly attached to the press crown 30. The vertical movement of the actuator rod 28 creates corresponding vertical movement of a press ram 32. The press ram 32 holds an upper tool 42 and a press bed 34 holds a lower tool 44. The to-be-formed part (e.g., a piece of sheet metal) is placed between the upper tool 42 and the lower tool 44. Though the tools 42 and 44 are shown to be ones that bend or shape a part under pressure, it should be understood that the press machine and press systems in accordance with the present invention can also be used with various tools on the press ram or press bed that form parts by cutting or severing a portion of a part, creating holes or perforations in parts, creating slots or grooves in parts, etc.

Figure 3:
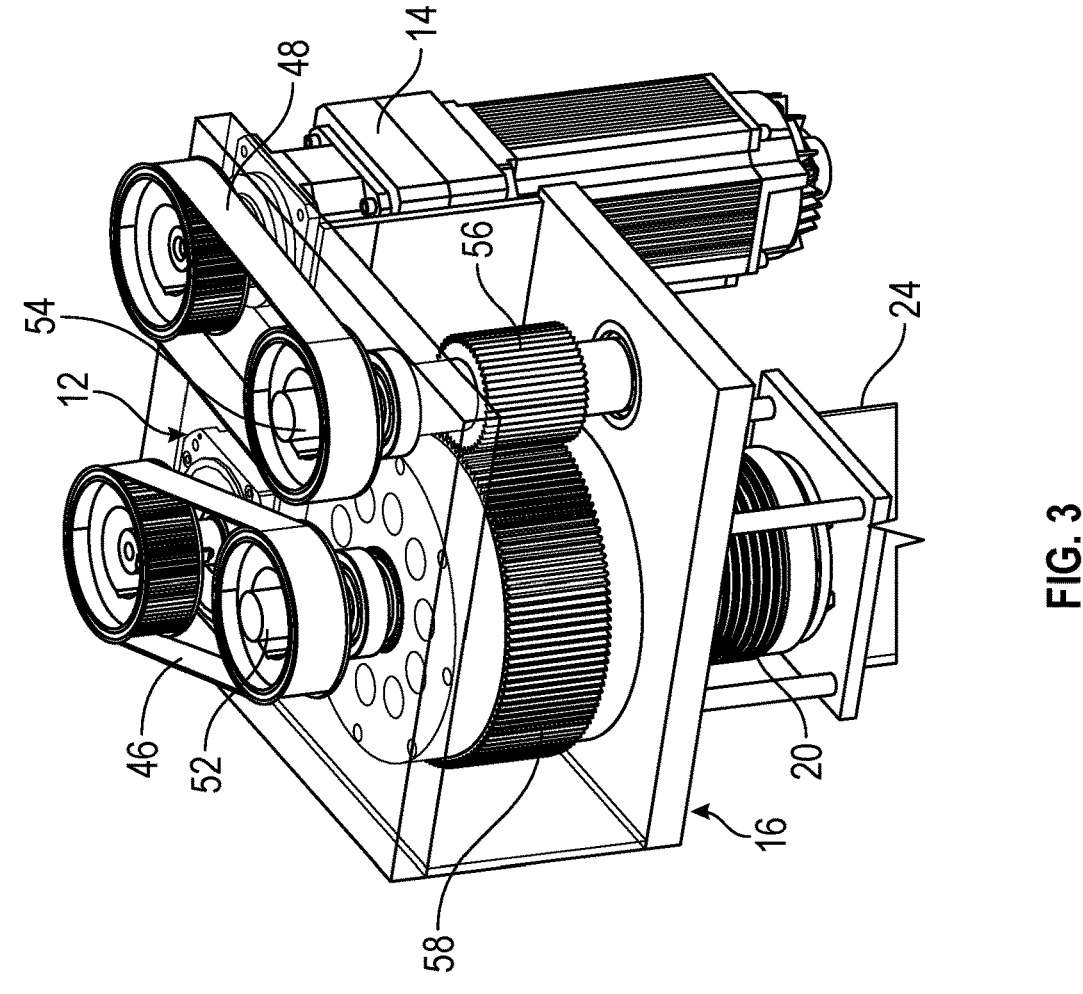
FIG. 3 illustrates a cut-away perspective view of the drive system for the linear-actuated press of FIG. 1.
Figure 2:
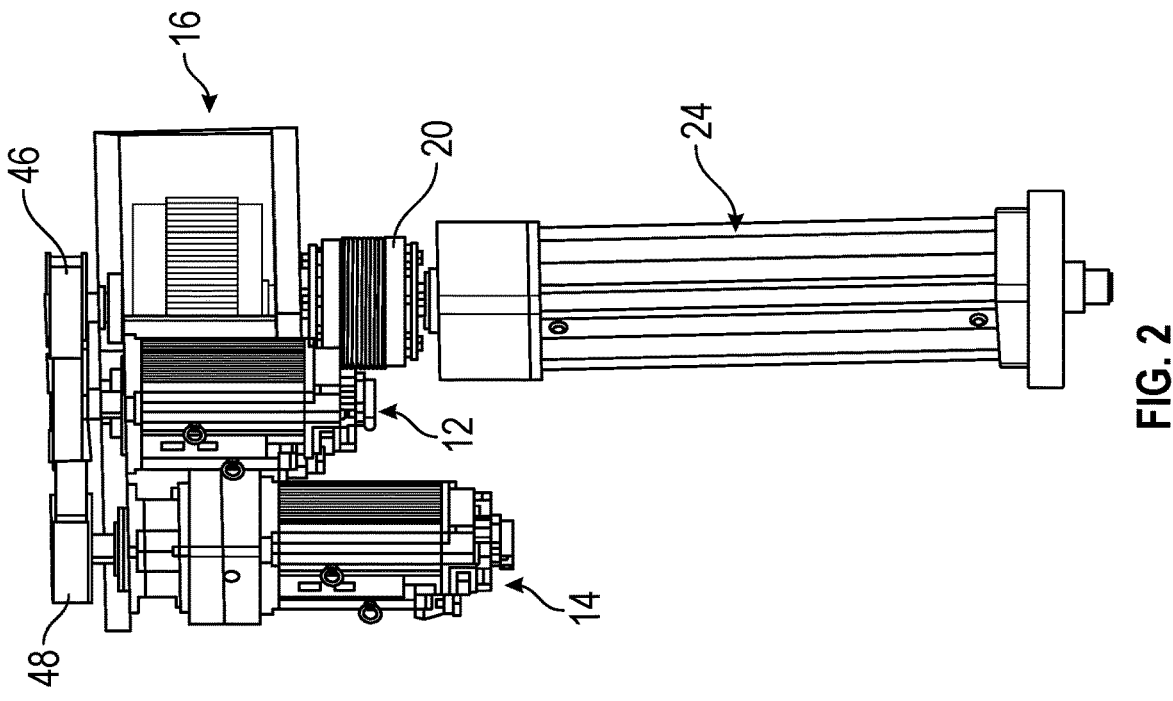
FIG. 2 illustrates a side view of the motors and linear actuator in the linear-actuated press of FIG. 1.

FIGS. 2 and 3 illustrate more details of the relationship between the first and second motors 12 and 14, the planetary gear system 16, the coupling device 20, and the actuator 24. The first motor 12 is coupled to a first pulley system 46, while the second motor 14 is coupled to a second pulley system 48. The first pulley system 46 drives a first input shaft 52 (connected to a sun gear 62, shown in FIG. 5) for the planetary gear system 16. The second pulley system 48 drives a second input shaft 54 for the planetary gear system 16, which is produced by an external gear 56 that mates with external teeth on the ring gear 58 of the planetary gear system 16. Consequently, rotational power provided by the second motor 14 causes the rotation of the external gear 56 in the same direction via the second pulley system 48 and, hence, rotation of the ring gear 58 in the opposite direction.

As an alternative, the first pulley system 46 and the second pulley system 48 can be replaced by gears that connect the motors 12 and 14, respectively, to the first input shaft 52 and the second input shaft 54.

Figure 4:
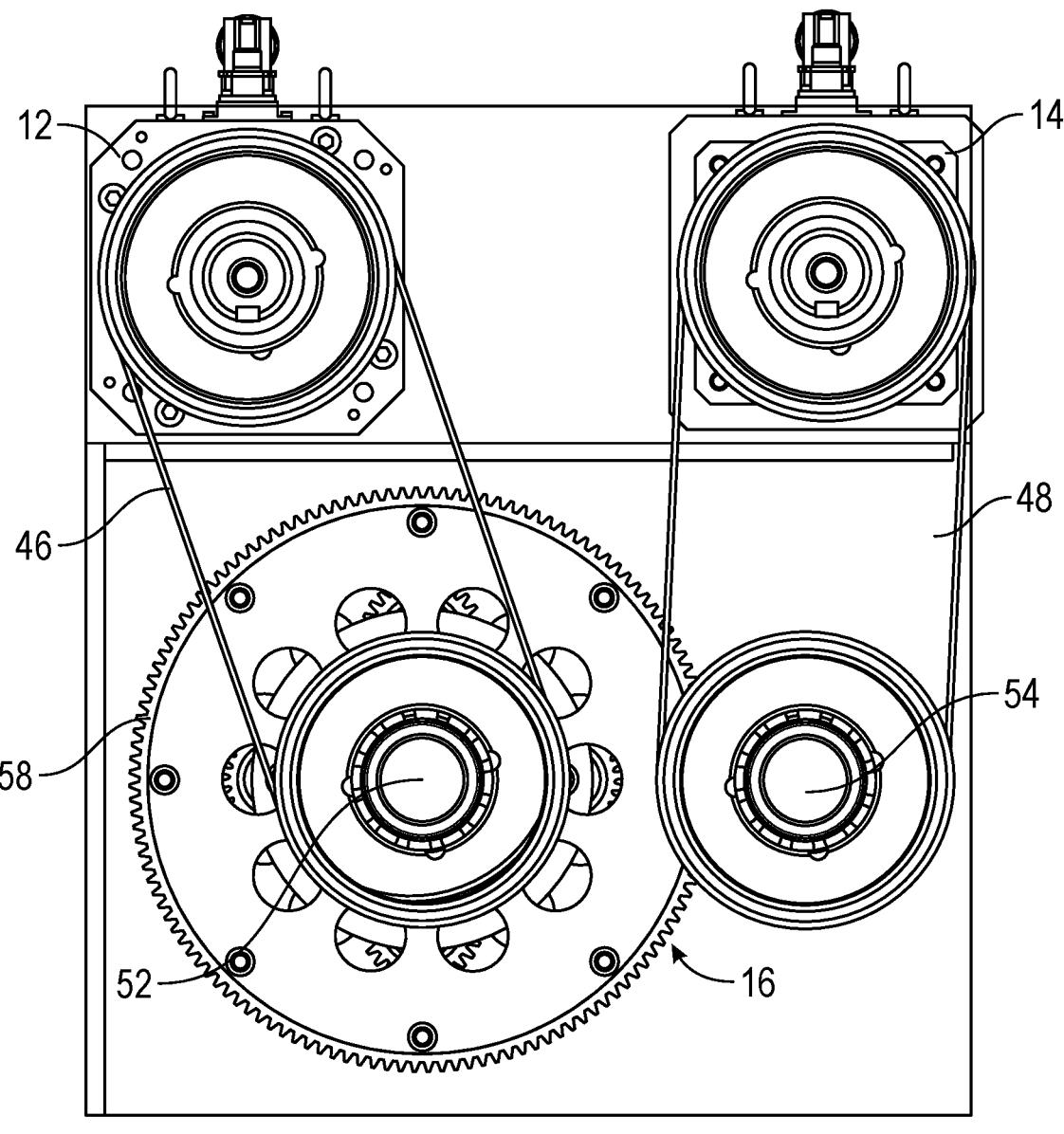
FIG. 4 illustrates a top view of the drive system for the linear-actuated press of FIG. 1.
Figure 5:
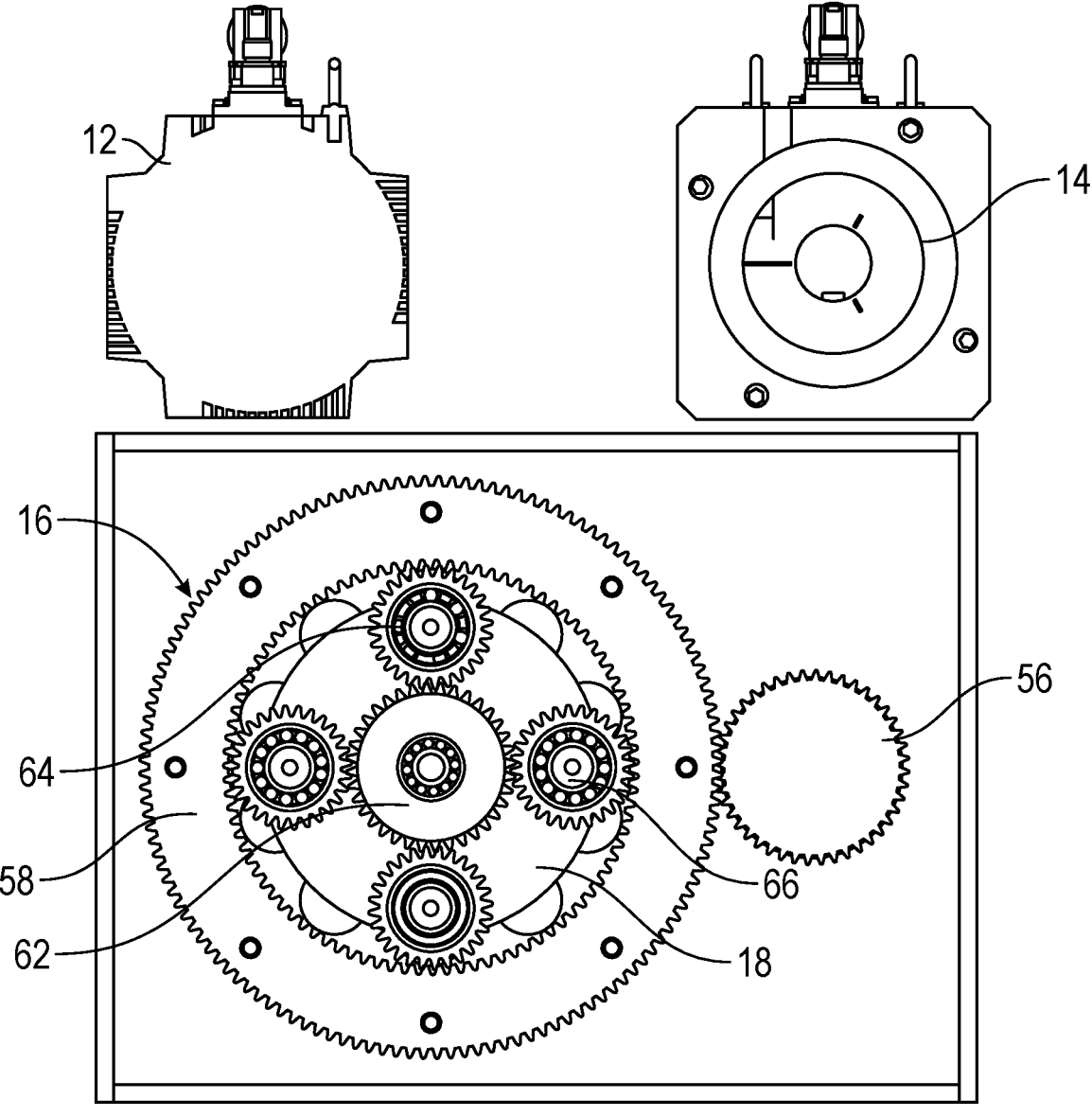
FIG. 5 illustrates the details of the planetary gear system for the linear-actuated press of FIG. 1.

FIGS. 4 and 5 illustrate the inner components of the planetary gear system 16. FIG. 4 shows the entire structure of the ring gear 58 in place along with the first and second pulley systems 46 and 48. FIG. 5 removes part of the outer structure of the ring gear 58 and the first and second pulley systems 46 and 48 for viewing the sun gear 62 and the planet gears 64. As seen in FIG. 5, the sun gear 62 of the planetary gear system 16 is coupled to the first input shaft 52, which is shown in FIG. 4. The sun gear 62 mates with the plurality of planet gears 64, which is shown as four planet gears 64 in the illustrated embodiment, although the number can change depending on the application (e.g., three, five or six planet gears). The planet gears 64 also mate with the inner teeth of the ring gear 58. Thus, the planetary gear system 16 can be driven by the second motor 14 via the ring gear 58 and the external gear 56, which is coupled to the second input shaft 54, or by the first motor 12 which is coupled directly to sun gear 62 and the first input shaft 52.

As shown in FIG. 5, the output shaft 18 of the planetary gear system 16 is a structure that is coupled to planet-gear axles 66 of the four planet gears 64. In other words, when the planet gears 64 are revolving around the sun gear 62, they are driving the output shaft 18 of the planetary gear system 16. As noted relative to FIG. 1, the output shaft 18 is connected to a coupling device 20, which, in turn, is connected to and rotates the actuator screw 22 of the linear actuator 24.

Figure 6B:
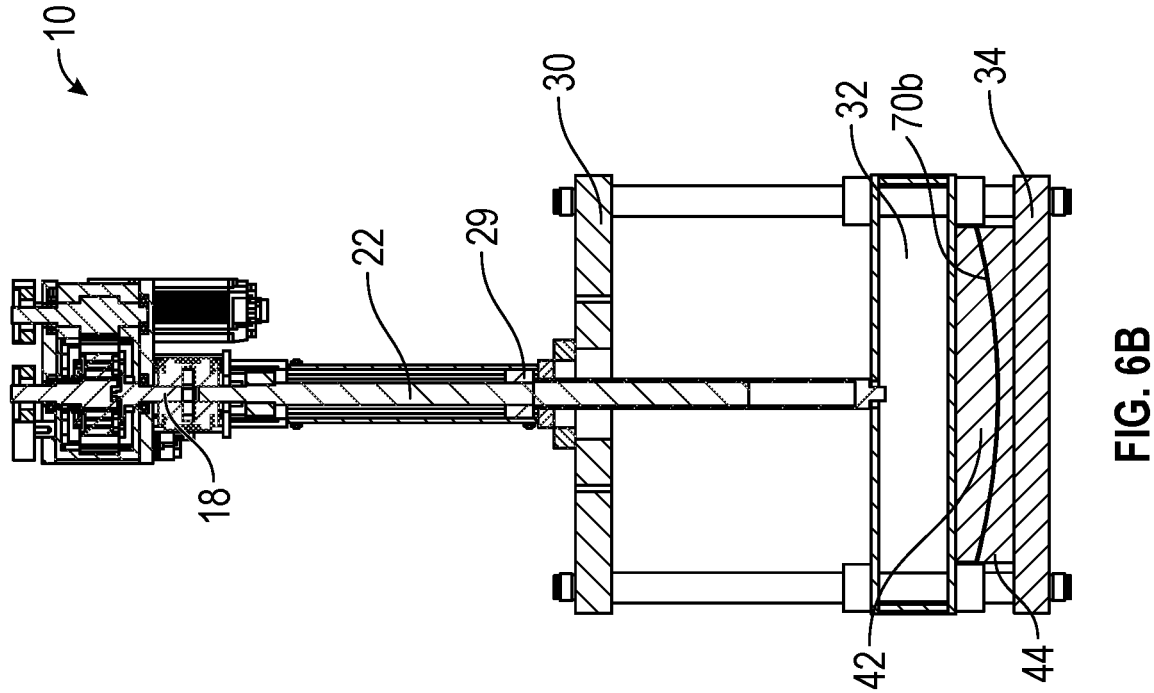
FIG. 6B illustrates the linear-actuated press in a closed state.
Figure 6A:
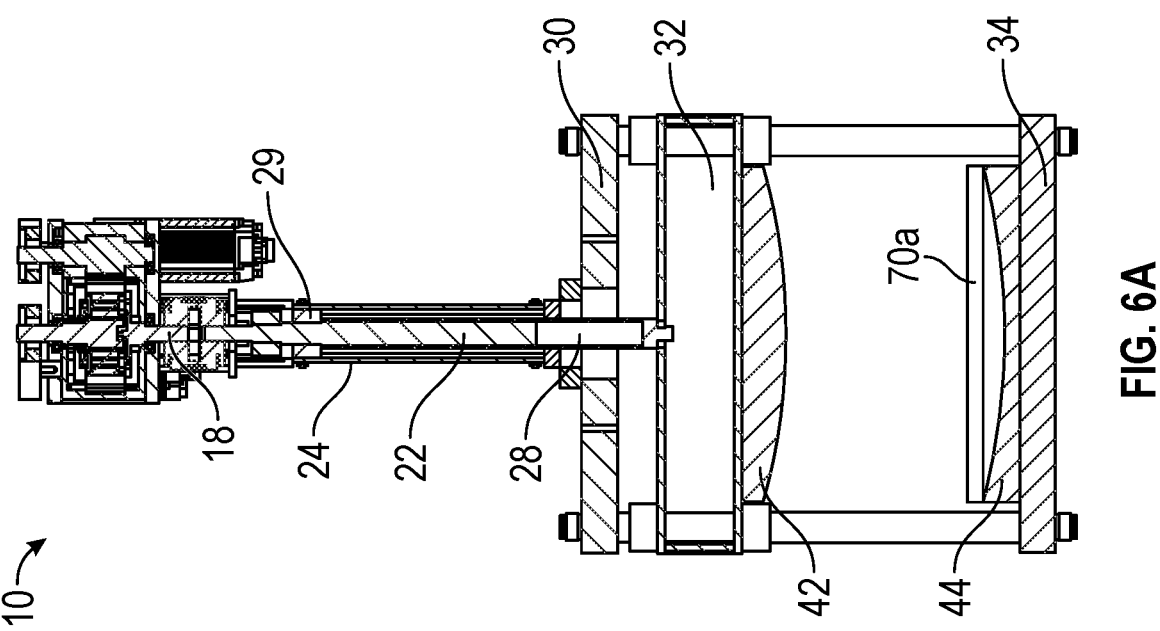
FIG. 6A illustrates the linear-actuated press in an open state.

FIGS. 6A and 6B illustrate the operation of the linear press 10 when forming a part 70a into a formed part 70b. The rotation of the output shaft 18 of the planetary gear system 16 causes the actuator screw 22 of the actuator 24 to rotate, but the actuator screw 22 remains in the same vertical position within the actuator 24. The actuator rod 28 of the actuator 24 is threadably coupled to the actuator screw 22 via the threaded portion 29 of the actuator rod 28. The threaded portion 29 of the actuator rod 28 has an external shape (e.g. square) the prohibits its own rotation by non-rotational engagement with a correspondingly shaped inner wall of the housing of the actuator 24. When the actuator screw 22 rotates in one direction (e.g., CW), the actuator rod 28 linearly moves in the downward direction. When the actuator screw 22 rotates in the opposite direction (e.g., CCW), the actuator rod 28 linearly moves in the upward direction.

The torque and the rotational speed on the output shaft 18 is controlled by the operation of the first motor 12 and the second motor 14. During the advancement stroke (FIG. 6A) when the actuator rod 28 is moving the press ram 32 and upper tool 42 toward the to-be formed part 70a, which is located on the lower tool 44 on the press bed 34, the linear motion velocity of the actuator rod 28 is preferably high since no force is yet needed for forming at this point. This is accomplished by operating the first motor 12 that drives the sun gear 62, which also caused the planet gears 64 to revolve around the sun gear 62. In some embodiments, to aid in the rotation of the planet gears 64 around the sun gear 62, the ring gear 58 may be held in place, usually by a brake associated with the second motor 14 or a brake associated with the second pulley system 48. Hence, the first motor 12 provides a high-rotational speed condition (but less torque) to the output shaft 18 of the planetary gear system 16. The male-female threaded connection of the actuator screw 22 and the actuator rod 28 convert the high-rotational speed condition to a high-linear speed condition on the actuator rod 28, such that the upper tool 42 moves quickly in the downward direction toward the to-be-formed part 70*a* in the advancement stroke.

When the upper tool 42 begins to engage the part 70, more force is needed. In this working stroke, the first motor 12 stops movement and the second motor 14 begins to drive the planetary gear system 16 such that the ring gear 58 is driving the planet gears 64 and, hence, the output shaft 18. To aid in the high-torque condition on the output shaft 18, the sun gear 62 is held stationary, usually by a brake associated with the first motor 12, a brake associated with the first pulley system 46, or a brake or locking device directly engaging the sun gear 62. The second motor 14 drives the male-female threaded connection of the actuator screw 22 and the actuator rod 28 in a high-torque condition (but with low-linear speed condition), such that the upper tool 42 moves slowly in the downward direction as it forms the part 70*a* with high-linear force as shown in FIG. 6B. In one embodiment, the second motor 14 operates at an RPM level that is at least 15 times greater than an RPM level of the output shaft 18 of the planetary gear system 18 when the second motor 14 is producing the high-force condition of the linear actuator 24.

Once the formed part 70*b* is finished, the second motor 14 stops operation and the first motor 12 begins to produce the retracting stroke, whereby the upper tool 42 and press ram 32 is pulled away from the now formed part 70*b*. Relative to the advancement stroke, the second first 12 operates in the reverse direction to cause the fast linear motion in the upward direction of the actuator rod 28. Once the press ram 32 is sufficiently pulled away from the press bed 34, the formed part 70*b* can be pulled from the linear press 10, and another to-be-formed part 70*a* is inserted onto the lower tool 44. The retracting stroke is then stopped, and the process moves back to the advancement stroke described above for forming another part.

By using the planetary gear system 16 with two separate motors 12 and 14 that provide different types of outputs to the output shaft 18, the overall productivity of the press machine 10 can be increased because the moving upper tool 42 can be quickly advanced to the to-be-formed part 70*a* and quickly retracted from the formed part 70*b* by use of the first motor 12, yet the high-force conditions (e.g., 100 tons, 125 tons, 150 tons, 200 tons) required to form the part 70*b* can still be accomplished by the second motor 14. In one embodiment for a 100-ton press, the first motor 12 can operate at about 1500 RPMs with a gear reduction of 3:1 in the planetary gear system 16 to produce an output of 500 RPMs. The second motor 14 also operates at about 1500 RPMs with a gear reduction of 25:1 in the planetary gear system 16 to produce an output of 60 RPMs. The actuator screw 22 has a lead of about 25 mm (about 1 inch) per revolution, which dictates the linear velocity of the male-female thread mechanism of the actuator 24. In this embodiment, the moving upper tool 42 moves at about 500 inches per minute when the first motor 14 is in operation and at about 60 inches per minute when the second motor 14 is in operation. In some embodiments, the planetary gear system 16 includes a gear reduction in the range of 2:1 to 5:1 for the first motor 12. In some embodiments, the planetary gear system 16 has a gear reduction in the range of 15:1 to 35:1 for the second motor 14. The actuator screw 22 may have a lead in the range of about 12 mm per revolution to about 30 mm per revolution.

Because the first and second motors 12 and 14 independently drive the planetary gear system 16, which drives the linear actuator 24, they can be different motors for producing the desired result on the actuator 24 (i.e., high-linear speed and low-force conditions, or low-linear speed and high-force conditions). And because the planetary gear system 16 allows one motor to be decoupled from the other motor (i.e., one motor rotates while the other motor is still), the possibility of one motor producing an undesirable condition on the other motor (e.g., RPM outside the other motor's limits) or on other parts associated with the other motor (e.g., the pulley systems) is eliminated.

Though brakes have been described, in some embodiments, it should be noted that the first motor 12 can drive the sun gear 62 to assist with the low-speed linear movement condition on the actuator 24 that is primarily brought about through the second motor 14. Similarly, the second motor 14 can drive the ring gear 58 to assist with the high-speed linear movement condition on the actuator 24 that is primarily brought about through the first motor 14.

Though the linear press 10 has been described by operation relative to a single actuator 24 that is coupled to the output of the single planetary gear system 16 driven by two motors 12 and 14, the present invention contemplates a linear press with multiple actuators 24 driving a single press ram 32, in which each of the multiple actuators 24 is associated with a single planetary gear system 16 driven by two motors. In such a design for a linear press, more force can be transferred to the upper tool 42 by multiple actuators 24, leading to more pressure for forming the parts by use of the multiple actuators 24 acting in parallel. The present invention also contemplates a linear press in which the high-linear speed condition is produced by a single motor that drives two sun gears of two different planetary gear systems, but has two motors that produce, respectively, the high-force conditions on the two planetary gear systems that drives the two actuators acting on press ram 32.

In a linear press 10 in accordance to the present invention, the downward force can result in 75 tons, 100 tons, 125 tons, 150 tons, 175 tons, 200 tons or more than 200 tons of force on the part 70 in the working stroke driven by the first motor. In one embodiment, the force provided by the linear press 10 is at least 50 tons, but preferably more than 100 tons. Further, the linear press 10 will provide a linear velocity of the upper tool 42 via the actuator 24 typically in the range of 300 to 700 inches per minute in the advancement and retraction strokes driven by the second motor 14. In one embodiment, the velocity of the actuator 24 is at least 250 inches per minute, is preferably greater than 500 inches per minute, and is most preferably greater than 750 inches per minute (such as 800 or 900 inches per minute). In these embodiments, the linear velocity brought about by the first motor 12 is: greater than about 4 times the linear velocity of the second motor 14, greater than about 5 times the linear velocity caused by the second motor 14, greater than about 6 times the linear velocity caused by the second motor 14, greater than about 7 times the linear velocity caused by the second motor 14, greater than about 8 times the linear velocity caused by the second motor 14, greater than about 9 times the linear velocity caused by the second motor 14, greater than about 10 times the linear velocity caused by the second motor 14.

Figure 7:
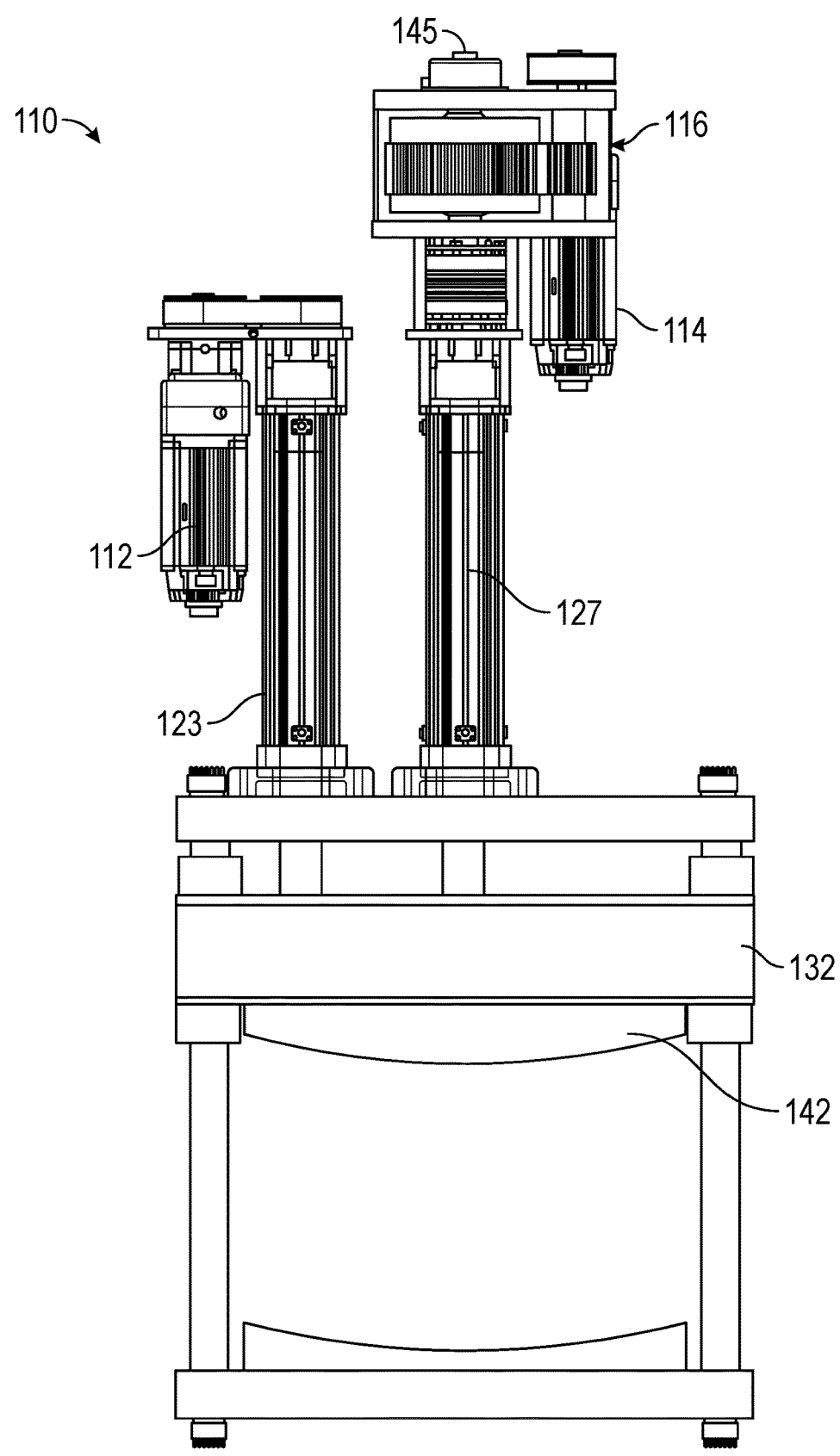
FIG. 7 illustrates an alternative linear actuated press system using two motors and two actuators.

FIG. 7 illustrates an alternative linear actuated press system 110 using first and second actuator arrangements, each of which has a motor and a linear actuator. A first motor 112 provides the high-speed/low force conditions and a second motor 114 provides the low-speed/high-force conditions. In the first actuator arrangement, the first motor 112 is coupled to a first linear actuator 123 having a male-female thread mechanism (e.g., threaded screw-nut engagement used in the prior embodiments) for quickly advancing and retracting a press ram 132 and an upper tool 142. In the second actuator arrangement, the second motor 114 acts upon a planetary gear system 116 to drive to a second linear actuator 127 having the male-female thread mechanism of the prior embodiments. The second motor 114 provides the low-speed/high-force condition to the press ram 132 and the upper tool 142 when a part is being formed.

The first actuator 123 is sized to provide enough force to advance the press ram 132 upwardly and downwardly in a high-speed/low-force condition. With a smaller torque requirement, the gear reduction associated with the first motor 112 is low, allowing for higher RPMs at the input shaft of the actuator 123, resulting in a faster approach speed. While the first motor 112 and the first actuator 123 are driving the press ram 122 rapidly to or from its operational position in which the part is formed, a brake 145 on the sun gear of the planetary gear system 116 that drives the second actuator 127 is released. Releasing the brake 145 allows the planet carrier, which is attached to the output shaft of the second actuator 127, to rotate at a different RPM than the RPM of the outer ring gear of the planetary gear system 116. Thus, the second actuator 127 is moved by movement of press ram 132 as the first actuator 123 and the first motor 112 move the press ram 132. The outer ring gear of the planetary gear system 116 on the second actuator 127 is not required to turn (but may turn slowly) during the rapid advance/retract portion of the travel due to the clutch-like action of the sun gear of the planetary gear system 116 being allowed to rotate. Despite the high-speed advancement or retraction, the outer ring gear rotates at a speed that results in the output shaft of the second motor 114 rotating (i.e., being driven) at a rate that is less than a speed that could damage the second motor 114

When high force is required, the brake 145 is engaged and sun gear of the planetary gear system 116 is held stationary and the ring gear of the planetary gear system 116 is now driven by the second motor 114, which is supplied with a high-gear ratio to multiply input torque to the level required for the low-speed/high-force condition that forms the part with the upper tool 142. During the high force condition of the press cycle, the first actuator 123 may optionally be active and contribute to the total force applied to the upper tool 142 within the press ram 132. Thus, the embodiment of FIG. 6 is a two-actuator system in which the planetary gear system is acting as a clutch for low-speed/high-force actuator 127.

The alternative press system 110 of FIG. 7 is advantageous when multiple high-force actuators are needed to provide a high press force output to the press ram 132. For example, if four 100-ton actuators 127 are needed to generate 400 tons of force to the press ram 132, the press system 110 can include four of the second motors 114 and four corresponding second actuators 127 to provide the required 400 tons of force (100 tons each). However, the press system 110 would only need a single first motor 112 and corresponding second actuator 123 to provide the high-speed advancement and retraction of the press ram 132 (i.e., five total motors for the press system 110). If the mass of the press ram 132 is high, then an additional first motor 112 is needed to provide the high-speed advancement and retraction of the press ram 132 (i.e., six total motors for the press system 110). The planetary gear systems 116 associated with the second motors 116 allow them to rotate at acceptable RPMs despite the male-female threaded mechanism of the second actuator 127 rotating at high RPMs during the high-speed advancement and retraction of the press ram 132.

Figure 8:
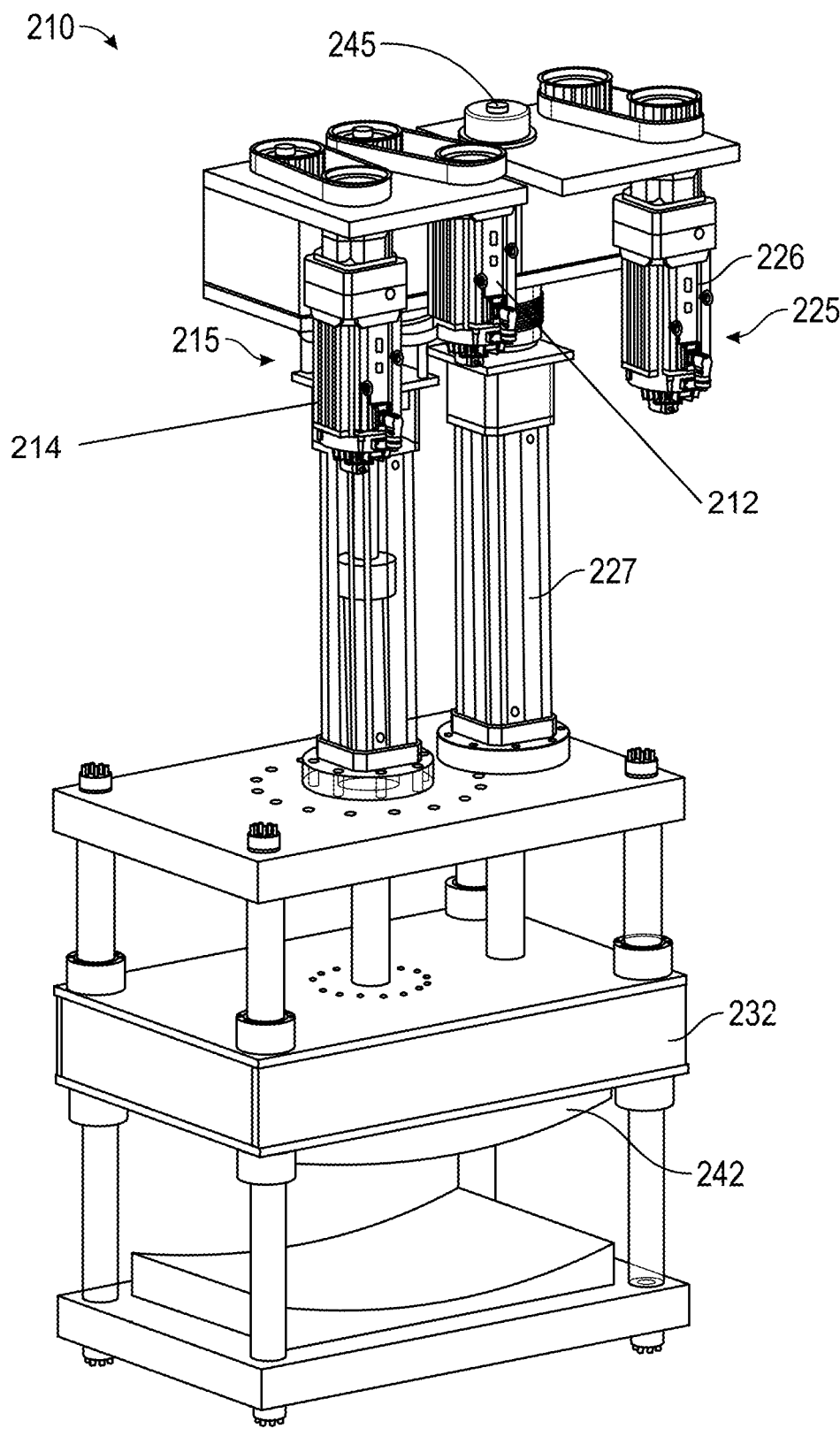
FIG. 8 illustrates an alternative linear actuated press system using three motors and two actuators.

FIG. 8 illustrates an alternative linear actuated press system 210 using three motors and two actuators. The left actuator arrangement 215 has the same configuration and operation of the press 10 of FIGS. 1-6 in that there are two motors 212, 214, one of which drives the sun gear of the planetary gear system and the other of which drives the outer ring gear. On the other hand, the right actuator arrangement 225 has only a single motor 226 that drives the actuator 227 in low-speed/high-force conditions when the press ram 232 is moving the upper tool 242 to form a part.

The right actuator arrangement 225 includes a planetary gear system (not shown) that couples the single motor 226 to the actuator 227 in the same manner as the second motor 114 and the second actuator 127 are coupled in FIG. 7. The right actuator arrangement 225 includes a brake 245 on the sun gear of the planetary gear system. Releasing the brake 245 allows the sun gear to rotate and allows the actuator 227 to follow the movement of the press ram 232 caused by the left actuator arrangement 215 when the left actuator arrangement 215 is actively moving in the high-speed/low-force condition. On the other hand, the brake 245 is engaged to hold the sun gear stationary (or at least slows its rotation) when the motor 226 of the right actuator arrangement 225 is helping to add driving force during the low-speed/high force condition as a part is being formed by the press ram 232 and the attached tool 242.

Relative to the embodiment of FIGS. 1-6, the linear actuated press system 210 of FIG. 8 adds an additional high-force actuator in the form of the right actuator arrangement 225 to provide more force to the press ram 232. The high-speed/low force retraction and advancement is provided by the high-speed motor 212 of the left actuator arrangement 215 while the low-speed/high force condition is provided by the high-torque motor 214. Further, in this high-speed/low-force mode, the right actuator arrangement 225 preferably uses a planetary gear system to couple the motor 226 and the actuator 227 having the male-female threaded mechanism and also the separate brake 245 to provide a clutch-like function and ensure the motor 226 of the right actuator arrangement 225 does not rotate at high RPMs that would otherwise damage the motor 226 because of high RPMs exceeding its speed rating. Alternatively, a clutch could be added to the right actuator arrangement 225 for this function.

Figures 9A, 9B, 9C:
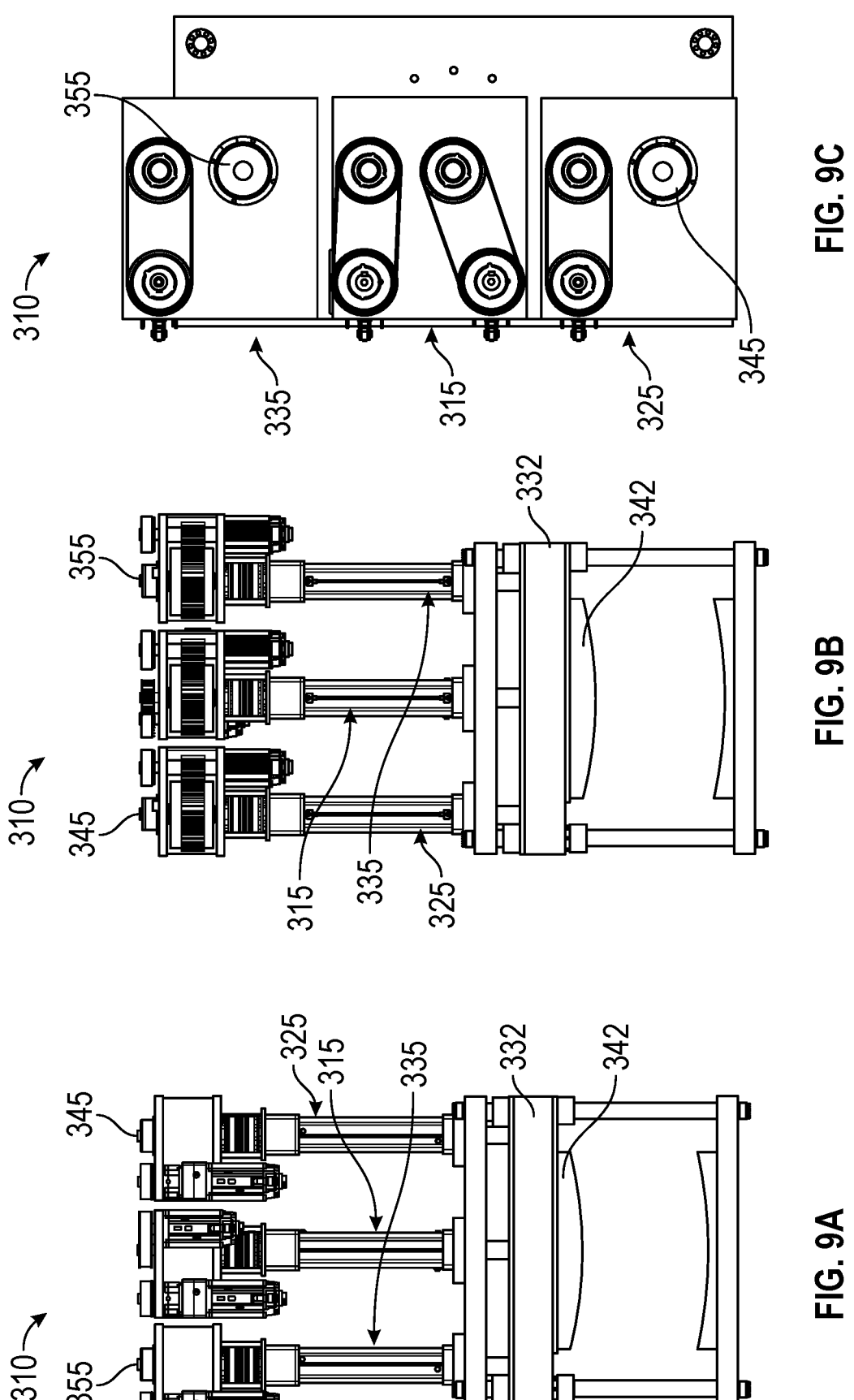
FIG. 9A illustrates a front view of an another alternative linear actuated press system using four motors and three actuators.
FIG. 9B illustrates a rear view of the linear actuated press system of FIG. 9A.
FIG. 9C illustrates a top view of the linear actuated press system of FIG. 9A.

FIGS. 9A-9C illustrate a front view, rear view, and top view, respectively, of an another alternative linear actuated press system 310 using four motors and three actuators that is similar to the embodiment of FIG. 8 except that the embodiment of FIGS. 9A-9C includes an additional actuator arrangement to deliver more force to the ram press 332 with the attached upper tool 342. In particular, the linear actuated press system 310 includes a first actuator arrangement 315 having two motors, an actuator, and a planetary gear system in a configuration that is consistent with the press 10 of FIGS. 1-6. Thus, the first actuator arrangement 315 includes a motor for operation in the high-speed/low-force mode, and an additional motor for operating in the low-speed/high-force mode.

A second actuator arrangement 325 includes a motor for operation in the low-speed/high-force mode, such that it is operational when the ram press 332 with the attached upper tool 342 are forming the part. The second actuator arrangement 325 also includes a planetary gear system that couples its actuator to the motor, and a brake 345 for acting upon the sun gear of the planetary gear system. The brake 345 is engaged when the motor of the second actuator arrangement 325 is operational to deliver high torque to the ring gear, which transfers the torque to the planet carrier that is coupled to the actuator (and, hence, the ram press 332) as the planetary carrier rotates around the stationary sun gear. The brake 345 is released when the motor of the second actuator arrangement 325 is not in operation (i.e., in the high speed/low torque mode of the press system 310) to allow the actuator to move at high advancement and retraction speeds such that the planet carrier rotates at high RPMs around the now-rotating sun gear, leading to less rotational speed being delivered to ring gear and the motor.

Like the second actuator arrangement 325, a third actuator arrangement 335 includes a motor for operation in the low-speed/high-force mode, such that it is operational when the ram press 332 with the attached upper tool 342 are forming the part. The third actuator arrangement 335 has the same configuration and function as the second actuator arrangement 325 to deliver additional force in the low-speed/high force condition as a part is being formed as its brake 355 is engaged on the sun gear of the planetary gear system for the third actuator arrangement 335. Its brake 355 is disengaged (allowing the sun gear to spin) when the first actuator arrangement 315 is driving the press ram 332 at a high rate of speed during advancement and retraction, forcing the screw-threaded actuator of the third actuator arrangement 335 to also move quickly. As noted above for FIG. 8, the planetary gear systems of the second actuator arrangement 325 and the third actuator arrangement 335 can be replaced by a clutch that limits the rotational speed of the motor when the motor of the first actuator arrangement 315 is operating in the high-speed/low-force mode.

The lead on threading on the male-female threaded mechanisms of the linear actuators of the second actuator arrangement 325 and the third actuator arrangement 335 is preferably the same. The lead on threading on the male-female threaded mechanism of the linear actuator of the first actuator arrangement 315 is also preferable the same as the other two, but could be a different lead as the other two.

In the linear press systems 110, 210, and 310 for FIGS. 7-9, the downward force can result in 75 tons, 100 tons, 125 tons, 150 tons, 175 tons, 200 tons, 300 tons, 400 tons, 500 tons, 600 tons, 700 tons, 800 tons or more the part in the working stroke driven by the low-speed/high-force motor(s) associated with the actuators. To the extent that more force is needed, an additional linear actuator can be added to provide the additional force. Further, the linear press systems 110, 210, and 310 for FIGS. 7-9 will provide a linear velocity of the upper tool 142, 242, 342 via the actuator in the range of 300 to 700 inches per minute in the advancement and retraction strokes driven by the high-speed/low-torque motors. In one embodiment, the linear velocity is at least 250 inches per minute and is preferably greater than 500 inches per minute. In these embodiments, the linear velocity in the high-speed/low-torque condition is: greater than about 4 times the linear velocity of the low-speed/high-torque condition, greater than about 5 times the linear velocity of the low-speed/high-torque condition, greater than about 6 times the linear velocity of the low-speed/high-torque condition, greater than about 7 times the linear velocity of the low-speed/high-torque condition, greater than about 8 times the linear velocity of the low-speed/high-torque condition, greater than about 9 times the linear velocity of the low-speed/high-torque condition, greater than about 10 times the linear velocity of the low-speed/high-torque condition.

As shown in the figures, the present invention is contemplated for use on the press machines 10, 110, 210, 310 in which the press ram 32, 132, 232, 332 slides along posts, such as a four-post press (all four posts can be seen, for example, in FIG. 8) or a two-post press. Furthermore, the present invention is also contemplated for use on the press machines 10, 110, 210, 310 in which the press ram 32, 132, 232, 332 moves along gibs (e.g., wedge-shaped gibs) in the frame that guide the reciprocating motion of the press ram 32, 132, 232, 332.

These embodiments and obvious variations thereof is contemplated as falling within the spirit and scope of the claimed invention, which is set forth in the following claims. Moreover, the present concepts expressly include any and all combinations and subcombinations of the preceding elements and aspects.

We claim:

1. A method of operating a linear-actuated press machine comprising a press ram with a tool, a first linear actuator having a first actuator rod that is coupled to the press ram, a second linear actuator having a second actuator rod that is coupled to the press ram, a high-speed motor coupled to the first linear actuator for providing a high-speed condition on the press ram, a first high-torque motor coupled to the first linear actuator, a clutch associated with the first high-torque motor, and a second high-torque motor coupled to the second linear actuator, the method comprising:

advancing the tool toward the part by operation of the high-speed motor associated with the first linear actuator, the clutch being disengaged during the advancing to limit the rotational speed of the first high-torque motor;

in response to the tool being positioned at or near the part, engaging the clutch associated with the first high-torque motor;

forming the part with the tool with at least 200 tons of force by simultaneous operation of the first high-torque motor associated with the first linear actuator and the second high-torque motor associated with the second linear actuator;

during the forming, maintaining the high-speed motor in an operational state such that the high-speed motor provides additional torque to the press ram; and after the part has been formed by the tool, retracting the tool from the part by operation of the high-speed motor associated with the first linear actuator.

2. The method of claim 1, wherein the first linear actuator includes a first male-female screw arrangement that includes an actuator screw that rotates but does not move linearly.

3. The method of claim 2, wherein the first actuator rod includes a threaded portion that is threadably coupled to the actuator screw to cause the actuator rod to linearly move along the actuator screw as the actuator screw rotates.

4. The method of claim 3, wherein the threaded portion is formed as an integral portion of the actuator rod.

5. The method of claim 1, wherein the first linear actuator includes a first actuator screw that rotates and the second linear actuator includes a second actuator screw that rotates, the first and second actuator screws having the same thread lead.

6. The method of claim 1, wherein the linear-actuated press machine further includes a second high-speed motor coupled to the second linear actuator, the second high-speed motor working in conjunction with the high-speed motor for the advancing.

7. The method of claim 1, wherein during the retracting, disengaging the clutch from the first high-torque motor.

8. A method of operating a linear-actuated press machine comprising
  a press ram with a tool,
  a first linear actuator arrangement having a first male-female screw arrangement that is coupled to the press ram, the first linear actuator arrangement includes a first motor coupled to the first male-female screw arrangement for producing a high-speed and low-torque condition on the press ram to advance or retract the press ram from the part, the first linear actuator arrangement includes a second motor coupled to the first male-female screw arrangement for producing a high-torque and low-speed condition on the press ram for forming the part,
  a plurality of second linear actuator arrangements, each of the plurality of second linear actuator arrangements having a second male-female screw arrangement that is coupled to the press ram, each of the plurality of second linear actuator arrangements including a high-torque motor for producing a high-torque condition on the press ram, each of the plurality of second linear actuator arrangements includes a clutch coupled to the corresponding high-torque motor,
  the method comprising:
    advancing the tool toward the part by operation of the first motor associated with the first linear actuator arrangement, the clutches of the plurality of second linear actuator arrangements being disengaged during the advancing;
    in response to the tool being positioned at or near the part, engaging the clutches of the plurality of second linear actuator arrangements;
    while the clutches are engaged, forming the part with the tool by simultaneous operation of the second motor of the first linear actuator arrangement and the high-torque motors of the plurality of second linear actuator arrangements; and

after the part has been formed by the tool, retracting the tool from the part by operation of the first motor associated with the first linear actuator.
9. The method of claim 8, wherein the first and second male-female screw arrangements include actuator screws that rotate but does not move linearly.
10. The method of claim 9, wherein the first and second male-female screw arrangements include actuator rods with threaded portions that are threadably coupled to the actuator screws to cause each of the actuator rods to linearly move along the corresponding actuator screw as the corresponding actuator screw rotates, each of the actuators rods being coupled to the press ram.
11. The method of claim 10, wherein the threaded portions are formed as integral portions of the actuator rods.
12. The method of claim 9, wherein the actuator screw for the first male-female screw arrangement has the same thread lead as the actuator screws for the second male-female screw arrangement.
13. The method of claim 8, wherein each of the plurality of second linear actuator arrangements includes a second high-speed motor that works in conjunction with the first motor for the advancing and the retracting.
14. The method of claim 8, wherein the first linear actuator arrangement further includes a clutch associated with the second motor to limit the rotational speed of the second motor during the advancing and the retracting.
15. The method of claim 8, wherein during the retracting, disengaging the clutches of the plurality of second linear actuator arrangements.
16. The method of claim 8, wherein the forming of the part with the tool occurs with at least 200 tons of force from the press ram.
17. The method of claim 16, wherein the press ram moves at a rate of at least 250 inches per minute while advancing the press ram toward the part.

* * * * *